United States Patent [19]

Faiczak

[11] 3,998,267

[45] Dec. 21, 1976

[54] TEMPERATURE CONTROL SYSTEM

[75] Inventor: John Faiczak, Toronto, Canada

[73] Assignee: Canada Square Management Ltd., Toronto, Canada

[22] Filed: May 21, 1975

[21] Appl. No.: 579,342

[30] Foreign Application Priority Data

May 16, 1975 Canada ............................. 227215

[52] U.S. Cl. ................................. 165/48; 137/357; 165/1; 165/2; 165/14; 165/18; 165/47
[51] Int. Cl.$^2$ ........................................ F25B 29/00
[58] Field of Search ................ 165/1, 2, 47, 48, 14, 165/18; 137/357

[56] References Cited
UNITED STATES PATENTS

| | | | |
|---|---|---|---|
| 3,905,153 | 9/1975 | Enter | 165/2 |
| 3,931,851 | 1/1976 | Harris | 165/2 |
| 3,933,197 | 1/1976 | Zimmer | 165/2 |
| 3,948,314 | 4/1976 | Creswick | 165/48 |

*Primary Examiner*—Charles J. Myhre
*Assistant Examiner*—Daniel J. O'Connor
*Attorney, Agent, or Firm*—Rogers, Bereskin & Parr

[57] ABSTRACT

A method and apparatus is disclosed for controlling the temperature in a building having a heat transfer load, a temperature control circuit containing a temperature control fluid for transferring heat energy to or from the building load, and a heat energy storage reservoir for storing heat energy. Energy is transferred between the storage reservoir and the fluid in the control circuit at optimum times to reduce the external energy required to control the temperature of the building. The amount of heat energy required to be transferred to or from the building load during a predetermined interval is predicted from load profiles. The amount of energy in the reservoir is measured to determine the amount of existing available energy to be transferred between the building load and the reservoir. A transfer unit is coupled to the control circuit to vary the heat energy in the field over the predetermined interval, so that the total energy available to be transferred is at least equal to the energy required to be transferred. Finally, the existing available energy to be transferred to or from the reservoir is dissipated by controlling the flow of fluid in the reservoir, so that the energy storage capacity is used at a rate proportional to the difference between the building heat transfer load and the rate of variation by the transfer unit. Heat energy or cooling capacity not immediately required is stored in the reservoir for later use during the predetermined interval.

23 Claims, 5 Drawing Figures

TEMPERATURE CONTROL SYSTEM

This invention relates to a method and apparatus for controlling the temperature in a building having a recirculating temperature control fluid for transferring heat energy in the building. In particular, the invention relates to a temperature control system that provides a gradual and controlled interchange of heat energy between a heat energy storage reservoir, an external energy transfer unit, and a building heat transfer load.

In larger buildings, such as highrise office buildings, it is usual to have a heating circuit and a cooling circuit for circulation of respective hot and cold temperature control fluids for heating and cooling the building. A heating and cooling plant is normally located in the basement, on the roof, or on a service floor intermediate of the basement and the roof. This plant respectively heats and cools the hot and cold temperature control fluids. A plurality of fan coil units are located throughout the building, and are connected into the heating and cooling circuits to transfer heat energy between the temperature control fluids and localized areas. Heat energy is transferred from the hot control fluid, or to the cold control fluid, depending upon whether the area requires heating or cooling, by the fan coil units. Normally, some areas of the building require heating while other areas require cooling, so both the heating and cooling circuits are operating simultaneously.

It will be appreciated that the total energy demand made on the heating and cooling plant depends on the sum of the individual heat transfer rates of all of the fan coil units. The units that are heating collectively form a building heating load, and the units that are cooling collectively form a building cooling load. The magnitude of the heating load and the cooling load, of course, depends upon the temperature outside the building and the season of the year, but usually the heating load is not equal to the cooling load.

A difficulty with the above type of temperature control system is that the heating and cooling plant must provide energy transfer outputs that are proportional to the instantaneous heating and cooling loads. Since the building loads fluctuate, this often results in wasted energy because the cooling circuit is used to remove energy from the building that was previously added to the building by the heating circuit, and vice versa. In addition, the power consumption of the heating and cooling plant is often maximum during periods of peak energy demand, when the cost of energy supplied to the building is highest.

Some of these difficulties may be overcome by providing a building heating and cooling system having an energy storage reservoir for storing heat energy that would be wasted otherwise. Such a system is described and claimed in copending United States patent application Ser. No. 579,341 filed concurrently herewith.

The present invention provides a temperature control system for a building having an energy storage reservoir with capacity to supply energy to or remove energy from the building load. This energy storage capacity is controlled to minimize the use of external energy and maximize the use of stored energy, thereby reducing the overall power consumption of the building heating and cooling plant.

According to one aspect of the invention, there is provided a method of controlling the temperature in a building having a heat transfer load. The method comprises passing a temperature control fluid through the building to transfer heat energy between the fluid and the building load. The amount of heat energy required to be transferred between the fluid and the building load over a predetermined interval is predicted. The amount of heat energy in the fluid is measured and the existing available energy to be transferred between the fluid and the building load is determined. The heat energy in the fluid is varied during the predetermined interval, at a point remote from the building load, if the existing available energy to be transferred is less than the energy required to be transferred, the variation being at a rate such that the total available energy to be transferred as varied over the predetermined interval is at least equal to the energy required to be transferred. The flow of fluid is controlled so that the existing available energy to be transferred is dissipated at a rate proportional to the difference between the rate of transfer of energy between the fluid and the building load, and said rate of variation.

According to another aspect of the invention there is provided a method of controlling the temperature of a building having a heat transfer load, a temperature control circuit containing a temperature control fluid, and heat energy storage means coupled to the control circuit. The method comprises passing the temperature control fluid through the temperature control circuit to transfer heat energy between the fluid and the building load. The amount of heat energy required to be transferred between the fluid and the building load over a predetermined interval is predicted. The amount of heat energy in the storage means is measured and the existing available energy to be transferred between the storage means and the fluid in the control circuit is determined. The heat energy in the fluid is varied during the predetermined interval, at a point between the storage means and the building load, if the existing available energy to be transferred is less than the energy required to be transferred, said variation being at a rate such that the total heat energy available to be transferred between the building load and the fluid over the predetermined interval is at least equal to said energy required to be transferred during said predetermined interval. The flow of fluid in the storage means is controlled so that the existing available energy to be transferred is dissipated at a rate proportional to the difference between the rate of transfer of energy between the fluid and the building load, and said rate of variation.

According to yet another aspect of the invention, there is provided apparatus for controlling the temperature in a building having a temperature control circuit containing a building heat transfer load, heat energy storage means, and a circulating temperature control fluid for transferring heat energy between the fluid and the building load. The apparatus comprises means for measuring the amount of heat energy in the fluid and for determining the existing available energy to be transferred between the fluid and the building load, and means for predicting the amount of heat energy required to be transferred between the fluid and the building load over a predetermined interval. An energy transfer unit is located in the control circuit between the storage means and the building load, the transfer unit being adapted to vary the heat energy in the fluid. Control means is coupled to the transfer unit for controlling the output of the transfer unit, so that if said existing available energy to be transferred is less than said energy required to be transferred, the transfer unit varies the heat energy of the fluid in the control circuit at a rate of variation such that the total available energy to be transferred is least equal to said energy required to be transferred over sid predetermined interval. Control means is located in the control circuit for controlling the circulation of fluid, so that said existing available energy to be transferred is dissipated at a rate proportional to the difference between the rate of transfer of energy between the fluid and the building load, and said rate of variation by the transfer unit.

A preferred embodiment of the invention will now be described, by way of example, with reference to the accompanying drawings, in which.

Figure 1:
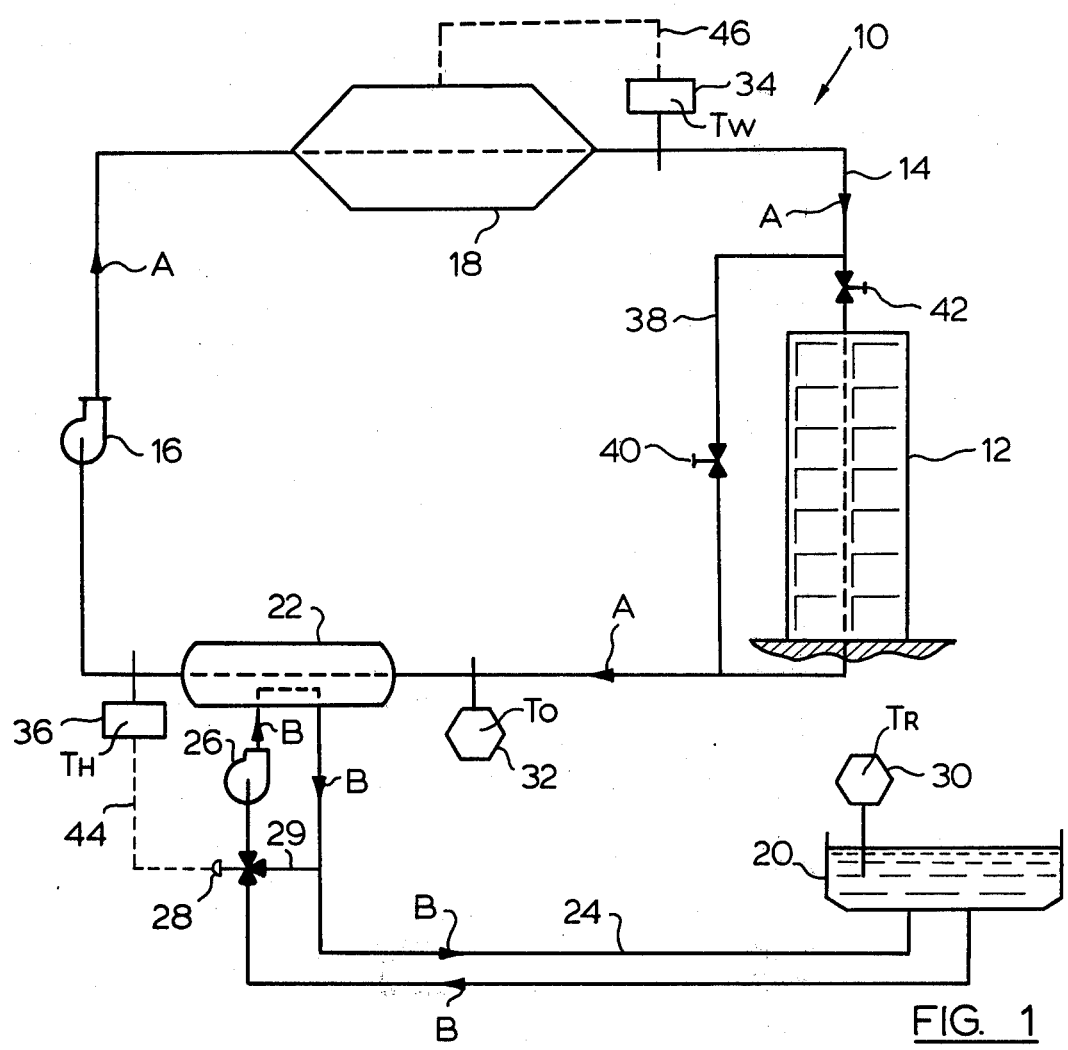
FIG. 1 is a schematic drawing of a simple temperature control system for heating or cooling a building.

Referring firstly to FIG. 1, a simplified temperature control system for a building is generally indicated by reference numeral 10. System 10 includes a building heat transfer load 12 and a temperature control circuit 14 through which a temperature control fluid, such as water, is circulated in the direction of arrows A by a pump 16. The heat transfer load 12 represents all of the sources of heat loss in a building when the building is being heated, and load 12 represents all of the sources of heat gain in the building when the building is being cooled. Heat energy is tranferred between the load 12 and the temperature control fluid in control circuit 14 when the building either is being cooled or heated.

System 10 also includes an energy transfer unit 18 for transferring heat energy to or from the temperature control fluid, depending on whether the total energy of the system is required to be increased or decreased. System 10 further includes an energy storage reservoir 20 coupled to control circuit 14 by a heat exchanger 22. Temperature control fluid is stored in reservoir 20 and is circulated by a pump 26 through a control circuit 24 (and through heat exchanger 22) in the direction of arrows B. It will be appreciated, that heat is transferred by heat exchanger 22 between the fluid in control circuit 14 and the fluid control circuit these because of the juxtaposition of the fluids, whenever there is a temperature differential in the fluids in thesse two circuits. The rate of this heat transfer is partly regulated by a two-way control valve 28, which is connected to a by-pass line 29 to control the amount of reservoir fluid flowing through control circuit 24 and heat exchanger 22. By controlling the rate of this heat transfer in heat exchanger 22, the rate of use of the total system heat energy for heating or cooling the building is controlled, as will be described more fully below.

Having described the basic components of temperature control system 10, the method and apparatus for operating this system to control the temperature of a building will now be described briefly, followed by a more detailed description. System 10 may be operated either to heat the building or alternatively to cool the building, but the operation of the system is similar in either case. For simplicity, the heating mode will be discussed first.

System 10 basically operates on a daily basis, with the temperature control fluid being continuously circulated through the building through circuit 14. By measuring the mass flow rate and the temperature of the fluid entering and leaving building load 12 at frequent intervals during the day, the amount of heat energy supplied to the building during the day can be calculated, as will be apparent to those skilled in the art and will be described further below. This information is kept on a historical basis and the data is used to predict approximately the heat energy requirements of the building for an upcoming predetermined interval, such as the following day. The preferred method for making this prediction will also be discussed below.

In addition to the prediction of the heat energy that will be required for the following day, another step in the operation of system 10, is to measure the amount of available heat energy to be transferred between the temperature control fluid and the building load for the following day. This available energy is approximated by measuring the energy stored in reservoir 20, relative to the temperature of the fluid in control circuit 14. The measurement of this stored energy is done by calculating the average temperature of the temperature control fluid in storage reservoir 20 (hereinafter denoted $T_R$ for temperature - reservoir). A plurality of temperature sensors, represented by temperature sensor 30, are distributed evenly throughout the reservoir to measure the temperature of a plurality of generally equal volume fluid segments. The temperatures of these segments are then averaged to give the average temperature $T_R$ of reservoir 20. The temperature of the control fluid in control circuit 14 is measured by a temperature sensor 32 located near the entrance to heat exchanger 22, which is normally the point of lowest temperature in control circuit 14 when system 10 is being operated as a heating system. This temperature is denoted $T_O$ (for temperature - out), being the temperature of the control fluid coming out of building load 12. By determining the temperature differential between sensors 30 and 32 ($T_R - T_O$), the instantaneous available heat energy to be transferred to the control fluid in control circuit 14 and thus to building heat transfer load 12 can be calculated. Basically, this available energy is a product of the temperature differential $T_R - T_O$, the mass of the fluid in reservoir 20, and the means specific heat capacity of the fluid in reservoir 20, as will be apparent to those skilled in the art, and will also be described more fully below.

Once the predicted required energy and the measured available energy is determined, the difference between these two quantities gives the amount of external of make-up energy that will have to be added to system 10 to heat the building for the upcoming predetermined interval, such as the following day. This external energy is then added to fluid control circuit 14 by energy transfer unit 18, which varies the heat energy in the control fluid at a point remote from building load 12. Transfer unit 18 adds or contributes energy to circuit 14 at a controlled rate during the following day (or other predetermined interval), so that at the end of this following day, the energy output or contribution of transfer unit 18 is equal to make-up required. Further, the addition of energy by transfer unit 18 is done at a sort of average or level rate (or several level rates) during the predetermined interval, so that wide power fluctuations or periods of high power consumption by transfer unit 18 are avoided during periods of peak energy demand by the building.

The energy contribution by transfer unit 18 to control circuit 14 is controlled by regulating the temperature differential of the fluid in control circuit 14 entering and leaving transfer unit 18. The temperature of the control fluid entering transfer unit 18 is generally constant during the predetermined interval, and therefore by setting and controlling the temperature of the control fluid at the output of transfer unit 18 (hereinafter denoted $T_W$ for temperature - water) the required temperature differential across transfer unit 18 can be maintained to provide the level make-up energy input desired for control circuit 14.

Temperature $T_W$ is determined or "set" at a preselected value based on the amount of external or make-up energy required to be added to control circuit 14. The calculation of $T_W$ involves the temperature of the control fluid entering transfer unit 18, and the mass flow rate through transfer unit 18, as will be described further below. Once temperature $T_W$ is set, a temperature controller 34 monitors the temperature of the control fluid in control circuit 14 at the output of transfer unit 18. Controller 34 regulates the external heat energy transferred by transfer unit 18 to control circuit 14 to maintain the required temperature $T_W$, and thus the required external or make-up energy contribution or the output of transfer unit 18.

With the energy transfer unit 18 operating to contribute the required make-up energy during the following day, heat exchanger 22 is then controlled so that heat exchanger 22 transfers the existing available or stored heat energy from reservoir 20 to control circuit 14 at a rate proportional to the difference between: the rate of transfer of energy between the control fluid and the building load, and the rate of contribution of energy by transfer unit 18. In other words, as the building load increases (i.e. more heating required in the building) the rate of dissipation of the existing available energy in reservoir 20 increases, and vice versa, so that the amount of stored or available energy transferred to the building load is maximized during periods of highest heating demand, and the existing stored energy is dissipated in a controlled manner over the predetermined interval. This enables the energy contribution of transfer unit 18 to be level or constant during the predetermined interval, rather than fluctuate as the building load fluctuates. The result is that stored or available energy is used during periods of peak energy demand, rather than the more expensive external energy which would otherwise have to be provided by transfer unit 18.

The energy contribution of heat exchanger 22 to control circuit 14 (i.e. dissipation of existing available energy in reservoir 20) is regulated by reference to the temperature of the fluid in control circuit 14 leaving or downstream of heat exchanger 22 (hereinafter denoted $T_H$ for temperature - heat exchanger). Temperature $T_H$ is held generally constant at a second preselected value (described below) during the predetermined interval by a temperature controller 36 which operates control valve 28. When a reservoir or stored energy is being used, control valve 28 regulates the fluid flow rate in control circuit 24 by controlling the amount of recirculation in by-pass line 29, so that heat transfer in heat exchanger 22 (from fluid control circuit 24 to control circuit 14) results in a temperature differential in control circuit 14 across heat exchanger 22 (this is also the effective temperature differential across the storage reservoir). This temperature differential is the difference between temperature $T_H$ and the temperature of the control fluid entering heat exchanger 22 (temperature $T_O$). In other words, the transfer of more heat energy from control circuit 24 to control circuit 14 by increasing the flow rate in circuit 24, results in an increased temperature differential $T_H - T_O$ across heat exchanger 22.

Temperature $T_O$ fluctuates or varies over the predetermined interval as the building heat transfer load 12 varies. For example, if building heating load 12 increases, more heat energy is removed from control circuit 14 by building load 12, and therefore temperature $T_O$ decreases. It will be appreciated, therefore, that if temperature $T_H$ is held constant, more heat energy is transferred from fluid control circuit 24 to control circuit 14 as temperature $T_O$ decreases, and vice versa. Thus, if temperatures $T_H$ and $T_W$ are held generally constant, the energy contribution of heat exchanger 22 to control circuit 24 (or the dissipation of stored energy from reservoir 20, occurs at a rate proportional to the building heat transfer load 12 (which in turn is proportional to temperature $T_O$ if temperature $T_W$ is constant). If temperature $T_H$ is not constant, stored or available energy is dissipated at a rate proportional to the difference between the building heat transfer load 12 and the rate of addition of energy by tranfer unit 18.

It will be apparent that the amount of existing available energy dissipated over the predetermined interval will depend upon the setting of temperature $T_H$. There are two methods of setting or controlling temperature $T_H$, however the method preferred because of its simplicity is to set $T_H$ at a fixed value above the lowest temperature $T_O$ predicted for the upcoming predetermined interval (this value is predicted when building load 12 is predicted, as discussed previously). This fixed value of $T_H$, and the second method of controlling temperature $T_H$ will be discussed in more detail below, but for the present description it is sufficient to appreciate that if temperature $T_W$ is constant, the rate of dissipation of stored energy increases or decreases as temperature $T_O$ respectively decreases or increases over the predetermined interval, until the maximum rate of dissipation occurs when the minimum temperature $T_O$ is reached.

The operation of system 10 in the cooling mode is similar to that described above, except that heat transfer load 12 is now a cooling load, and the temperature control fluid is used to remove heat energy from building load 12. Again, the amount of heat energy required to be removed during the predetermined interval (following day) is predicted from historical data. Also, the amount of existing available energy to be transferred or capable of being transferred from the building to the control fluid or storage reservoir during the following day is determined. However, in the cooling mode, the average temperature $T_R$ in storage reservoir 20 is lower than the temperature $T_O$, now normally the point of highest temperature in control circuit 14. The temperature differential between sensors 32 and 30 ($T_O - T_R$) therefore is used to determine the instantaneous existing available heat energy capable of being transferred from the control fluid in circuit 14 (and thus building load 12) to storage reservoir 20 (via control circuit 24).

Once the heat energy required to be removed from building load 12 is predicted, and the available energy capable of being stored is determined, the difference between these two quantities gives the amount of energy that will have to be removed externally from control circuit 14 during the following day by energy transfer unit 18 (i.e. make-up cooling). Again, the removal of heat energy by transfer unit 18 is done at a controlled or level rate during the following day to avoid high power consumption during periods of peak energy demand by the building. Also, the rate of heat transfer to reservoir 20 through heat exchanger 22 is controlled, so that the available storage capacity is dissipated (i.e. energy is tranferred to reservoir 20) at a rate proportional to the difference between: the rate of transfer of energy between the building load and the control fluid, and the rate of cooling by transfer unit 18. As in the heating mode, this storage capacity is therefore used during periods of peak energy demand, thereby reducing the amount of external cooling or external power required to be provided by transfer unit 18 to the building.

Having described the basic method and apparatus for operating temperature control system 10, some additional operating modes will now be described briefly for this system. For example, it will be appreciated that the predicted required energy may be equal to or less than the measured available energy in certain circumstances. In this case, no external or make-up energy is required to be added to system 10 by transfer unit 18 to heat or cool the building for the upcoming predetermined interval. System 10 is then "freewheeling," since the total energy requirement is being supplied by reservoir 20. This situation may occur in either the heating or cooling operation of system 10.

It will also be appreciated that when system 10 is being operated as a heating system, the heat energy content of reservoir 20 is normally being depleted (i.e. temperature $T_R$ is being lowered). Of course, if the available energy in reservoir 29 is totally depleted (temperature $T_R$ is equal to or less than temperature $T_O$) then transfer unit 18 must supply all of the heat energy required to heat the building. Similar considerations apply when system 10 is being operated as a cooling system. In this case, temperature $T_R$ is rising, and when temperature $T_R$ is equal to or greater than temperature $T_O$, transfer unit 18 must supply all of the cooling required for the building.

In order to ensure that there will be sufficient stored energy to operate system 10, it will be apparent that sytem 10 can be operated in reverse to increase the available energy in reservoir 20. For example, system 10 could be operated as a cooling system to store heat energy in reservoir 20. This heat energy to be stored is taken from building load 12 (i.e. cooling the building). Alternatively, the heat energy to be stored could be supplied directly from transfer unit 18. If it is not desirable to cool or heat the building during this storage, a by-pass line 38 controlled by valves 40, 42 may be used, so that the control fluid in control circuit 14 passes through by-pass line 38 rather than building load 12. However, valve 40 is normally closed and valve 42 is normally open, so that the temperature control fluid normally passes through and is altered in temperature by building load 12.

Similarly, system 10 may be operated as a heating system to remove heat energy from reservoir 20, or alternatively, transfer unit 18 can be used to cool reservoir 29 directly by by-passing the building load and tranferring heat energy in heat exchanger 22 from control circuit 24 to control circuit 14. In either case, temperature $T_R$ is being lowered and heat energy is being removed from reservoir 20. The reservoir is therefore being "charged" with cooling capacity.

It may be desirable to store heat energy in reservoir 20 or charge the reservoir with cooling capacity, when system 10 is initially being started up. However, the more usual situation is where system 10 is being used alternatively as a heating system and as a cooling system over successive predetermined intervals. This situation frequently occurs where the predetermined intervals correspond to day operation and night operation. The system is operated to cool the building in the day time, meanwhile storing heat energy in the reservoir, and then the system is operated to heat the building in the night time, thereby charging the reservoir with cooling capacity for use during the following day time predetermined interval.

Turning now to the operation of system 10 in detail, it is helpful to consider the relationship of heat transfer to the flow of temperature control fluid in various parts of system 10. Again, system 10 will be discussed as being operated in the heating mode unless otherwise indicated, but similar considerations apply for the cooling mode of operation. As described above, the heat energy transferred to or from building load 12 during a predetermined interval is determined from the mass flow rate through load 12 and the temperature differential across the load (i.e. the temperature differential $T_w - T_O$). In fact, the amount of energy transferred is a product of the time interval and the heat transfer rate to or from the load. This heat transfer rate is a product of the temperature differential across the load ($T_W - T_O$), the mass flow rate of the control fluid through the load, and the mean specific heat capacity of the control fluid. Since the mass flow rate through control circuit 14 is generally uniform in the preferred embodiment (due to constant output of pump 16), the rate of heat transfer through the load can be expressed as a product of the temperature differential across the load and an overall system constant determined from the design of circuit 14 (i.e. pipe sizes, flow rates, control fluid, etc.).

It will be apparent that similar considerations apply to both transfer unit 18 and heat exchanger 22. In either case, the amount of heat energy transferred to or from control circuit 14 by these elements is a product of the time interval in question, the temperature differential across the elements, and this overall system constant (hereinafter referred to as the system "flow constant"). Since the amount of heat energy transferred by the element in any given time interval is directly proportional to the temperature differential across the element, it follows that the heat transfer contribution of the element can be controlled by controlling the temperature of the fluid input or output (or both) of the element. As discussed above, the rate of heat transfer occurring in transfer unit 18 and heat exchanger 22 is achieved by controlling the temperature of the fluid output in control circuit 14 downstream of these elements. For example, if it desired that transfer unit 18 transfer heat energy at a certain rate to or from circuit 14 over a predetermined interval, then the temperature differential across unit 18 necessary to do this is determined by dividing this energy transfer rate by the system flow constant. If the temperature entering transfer unit 18 is known, then the required output temperature from unit 18 can be determined from this calculated temperature differential. As will be apparent to those skilled in the art, similar calculations can be made as required for determining temperature settings, heat transfer rates and total heat energy contributions of the various other elements in system 10.

Once the various temperature settings have been made to operate system 10 in the desired manner (the "setting" of these temperatures will be described further below), the control of the rate of heat transfer occurring in transfer unit 18 and heat exchanger 22, as discussed above, is achieved by controlling the temperature in control circuit 14 of the fluid output from these units. The control of these output temperatures involves two steps. Firstly, the temperatures are selected or set, and then the set temperatures are monitored and maintained at the set levels by controllers 34, 36. The monitoring and maintaining of these output temperatures is done by using conventional temperature controllers 34, 36 each of which compares a "set" temperature with a "sensed" temperature, and provides an appropriate output signal if there is a predetermined differential in these temperatures. For example, temperature controller 36 senses the temperature in control circuit 14 of the control fluid coming out of heat exchanger 22 (temperature $T_H$). When system 10 is operating in the heating mode, if the "sensed" $T_H$ is higher than the "set" $T_H$, controller 36 provides a control signal through signal line 44 to valve 28, and valve 28 increases the by-pass flow through by-pass line 29 to reduce the flow in control circuit 24, thereby reducing the heat transfer in heat exchanger 22 from control circuit 24 to control circuit 14. This causes the actual or sensed $T_H$ to drop until it reaches the "set" $T_H$. Similarily, if the sensed $T_H$ is too low compared to the set $T_H$, control valve 28 increases the flow in control circuit 24, to increase the heat transfer in heat exchanger 22, thereby raising the sensed $T_H$ to the set $T_H$. It will be apparent that controller 36 and control valve 28 work in a manner similar but opposite to that just described, when system 10 is operating in the cooling mode. The operation of temperature controller 34 is similar to controller 36, in that controller 34 senses the temperature of the control fluid in control circuit 14 coming out of transfer unit 18 (temperature $T_W$). If the sensed $T_W$ is different than the set $T_W$, a control signal is provided through signal line 46 to regulate or control the external energy transfer contribution of transfer unit 18 by regulating the heating or cooling output of unit 18 (as will be described more fully below) until the sensed $T_W$ corresponds with the set $T_W$.

As discussed previously, one of the first steps in the control of system 10 is to predict the heat transfer load 12 for the up-coming predetermined interval. The preferred method of making this prediction will now be described in detail. In the preferred embodiment, the predetermined interval is the following day or 24 hour period, but this interval is divided into a day portion, from time 0500 hours to 1800 hours, and a night portion, from time 1800 hours to the following 0500 hours.

Figure 2:
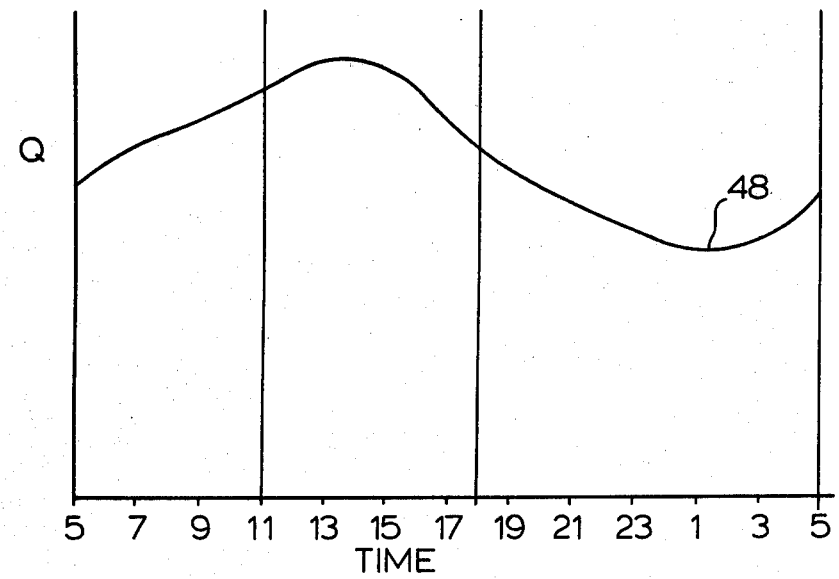
FIG. 2 is a graph showing a typical daily heating or cooling load profile for a building.
Figure 3:
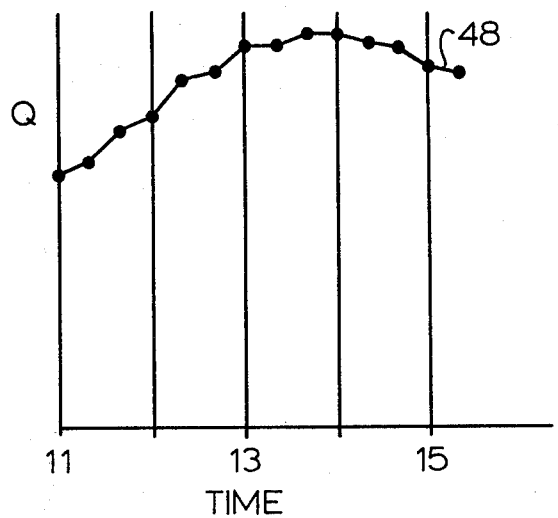
FIG. 3 is an enlargment of a portion of the graph shown in FIG. 2.

The rate of heat transfer from or to fluid control circuit 14 respectively to or from building load 12 is measured and recorded at 20 minute intervals over the 24 hour predetermined interval. As discussed above, this rate of heat transfer is a product of temperature differential $T_W - T_O$ and the system flow constant. Referring to FIG. 2, there is shown a graph representing a typical load profile 48 produced from the measured heat transfer values at these 20 minute intervals. FIG. 3 shows an enlarged portion of the graph shown in FIG. 2. The vertical axis is labelled with the letter Q, which represents heat transfer rate in BTU's per hour, or calories per hour, or other convenient units (e.g. Tons of cooling). The horizontal axis represents the 24 hour predetermined time interval. Each of the values is updated after its corresponding current 20 minute interval has expired, so that at time 0500 hours profile 48 represents a plot of the heat transfer load 12 for the previous 24 hour period.

The load profile represented by FIG. 2 is actually produced using weighted average data values for the heat transfer load. Thus, profile 48 represents a predicted plot of heat transfer rates for the upcoming predetermined interval. In addition, separate profiles are produced using data from several previous weekdays, and several previous Saturdays, Sundays and holidays, as described further below. Further, separate profiles are produced for system 10 when operated in both the cooling mode and the heating mode. The result is that four profiles are produced: two for the heating mode (one for weekdays and one for Saturdays etc.), and two for the cooling mode (one for weekdays and one for Saturdays etc.). The profiles or the data values to produce the profiles are updated and weighted according to following equation:

$$Q_{profile} = (1-p) Q_{old} + p \times Q_{current}$$

where:
$Q_{profile}$ = new heat transfer value (rate) and used in profile
$Q_{old}$ = previous heat transfer value used in profile
$Q_{current}$ = measured heat transfer value for previous 20 minute interval
$p$ = sample weight = 0.4 for weekdays and = 0.6 for Saturdays, etc.

Once the weighted average load profiles have been produced, the prediction of the required heat transfer load 12 for the upcoming predetermined interval can be made. Since profile 48 represents the predicted heat transfer load rates for the upcoming predetermined interval, it will be appreciated that the amount of heat energy required to be transferred to or from load 12 over the interval may be projected or obtained by integrating the equation representing profile 48. However, for simplicity, the predicted energy requirement is approximated by calculating the energy for each 20 minute interval. The average value of the heat transfer rate at the beginning and end of the interval is multipled by the 20 minute time interval, and these amounts are added to give the total predicted energy requirement.

Similar calculations can be made to predict or project the heat transfer load 12 for the remainder of the day portion of the predetermined interval or the remainder of the night portion of this interval. These "remainder" portions of the day or night then become the predetermined interval for subsequent calculations. In either case, the same profile 48 is used, but only the particular data values in question for the remainder predetermined intervals are used in the calculations.

Another step in the control of system 10 is to measure the amount of existing available heat energy in the control fluid to be transferred to or from building load 12. In the preferred embodiment, the amount of existing available energy in the control fluid is approximated by measuring the average temperature $T_R$ of the control fluid in reservoir 20, and the quantity of fluid in reservoir 20. The quantity of fluid in reservoir 20 is in the order of 1.0 to 1.5 million gallons. The quantity of fluid in control circuits 14, 24 is not considered in the calculation of available energy.

As discussed above, reservoir 20 has a plurality of temperature sensors therein for measuring the average temperature of generally equal volume fluid segments in the reservoir. The measurement of available energy is made on the assumption that all of the heat energy in each segment will be transferred to the control fluid in control circuit 14, which is at temperature $T_O$ where the transfer will be made (heat exchanger 22). The available energy for each segment is therefore a product of the temperature differential between $T_O$ and the temperature of that segment, the quantity or mass of the fluid in the segment, and the mean specific heat capacity of the fluid the total available energy is the sum of the available energy for each segment. The same result can be achieved by calculating the average temperature $T_R$ of the fluid in reservoir 20, and from this calculating the total instantaneous available energy with respect to temperature $T_O$.

Having determined the predicted required heat energy and the instantaneous available energy, the next step is to calculate the necessary external or make-up energy required to be added to control circuit 14 by transfer unit 18. From this calculation, temperature $T_W$ is set so that the heat energy in control circuit 14 is varied by the required external energy added or removed by transfer unit 18.

The amount of make-up energy required to be added or removed from control circuit 14 is basically the difference between the predicted required heat energy and the instantaneous or existing available energy. However, the total or sum of the available energy and the make-up energy is preferably made from 110 to 115 per cent of the predicted energy requirement. Therefore, the make-up energy is calculated to be somewhat higher than would be required to just meet the predicted energy requirement. The reason for this excess make-up energy is that the actual heating load 12 may be higher than the predicted heating load 12. In this case, without this excess make-up energy, the stored available energy may be dissipated prematurely, and transfer unit 18 would be required to supply the total energy requirements of building load 12. It is generally undesirable to operate system 10 with transfer unit 18 providing the total building energy requirements, because of the inefficiencies resulting from this mode of operation, as discussed previously.

If the actual heat transfer load 12 is equal to or less than the predicted heat transfer load, then the excess heat energy or cooling capacity provided by transfer unit 18 is merely stored in reservoir 20 to become existing available heat energy or cooling capacity for use in the next predetermined interval.

The calculation of make-up energy required and the setting of temperature $T_W$ is obtained from the following formula:

$$A + B = X \times C$$

wherein
 $A$ = make-up energy required;
 $B$ = available energy in reservoir;
 $C$ = predicted heat transfer load; and
 $X$ = 1.10 to 1.15

$B$ and $C$ have calculated numerical values, and $A$ may be further expressed as:

$$A = (T_W - T_H) \times (\text{system flow constant})$$

As discussed above, a numerical value for the system flow constant can be calculated from the mass flow rate in control circuit 14. Temperature $T_H$ may be chosen, as described below, or a value for $T_H$ may be already known from a previous calculation. However, once temperature $T_H$ has been determined, it will be appreciated that it is a simple matter to solve the above equation for $T_W$, so that the sum of the available energy and the make-up energy provided by transfer unit 18 is 110 to 115 percent of the required or predicted heat transfer load. Temperature $T_W$ is then set for the operation of system 10, and this temperature is monitored and maintained by controller 34.

Once temperature $T_W$ has been set, another step in the control of system 10 is to control the flow of control fluid so that the available energy is dissipated at a rate proportional to the transfer of energy between the fluid and building load 12. As discussed above, if the setting of temperature $T_W$ is changed during the predetermined interval (for example, by up-dating the calculations and settings, as discussed below), then the available energy is dissipated at the rate proportional to the difference between the rate of transfer of energy between the fluid and the building load, and the rate of energy addition by transfer unit 18. However, the dissipation of available energy amounts to determining and setting temperature $T_H$, since this controls the flow of control fluid (by controller 36) in control circuit 24.

In the preferred embodiment, temperature $T_H$ is set 8 degrees above (when system 10 is heating), or 8° below (when system is cooling), the respective lowest or highest recorded temperature for $T_O$ during the previous predetermined interval. Temperature $T_H$ is then kept at this setting for the remainder of the predetermined interval. For simplicity, this lowest or highest previous temperature $T_O$ is used as a prediction of the lowest or highest temperature $T_O$ for the upcoming predetermined interval. The temperature differential of 8 degrees is determined from the design characteristics of heat exchanger 22, being the maximum temperature differential that the heat exchanger is capable of producing.

The reason for setting $T_H$ to achieve the maximum temperature differential between $T_H$ and the predicted extreme $T_O$, is that when this extreme temperature $T_O$ is reached, heat exchanger 22 then will be transferring available energy to control circuit 14 at the maximum transfer rate that heat exchanger 22 and control circuit 24 can produce. It will be appreciated for example, that at the beginning of the predetermined interval when system 10 is in the heating mode, temperature $T_O$ is usually substantially higher than the minimum temperature that $T_O$ will reach later on in the predetermined interval because the heat transfer rate in building load 12 is substantially below the maximum for the predetermined interval. The temperature differential $T_H - T_O$ is therefore low and the usage of available energy is low. As the heat transfer rate in building load 12 increases during the predetermined interval, temperature $T_O$ will drop and temperature differential $T_H = T_O$ will increase, so that available energy is used in proportion to the transfer of energy to the building load. It will be appreciated, that if temperature $T_W$ is constant, temperature $T_O$ reflects the actual heat transfer load 12 and the available energy is dissipated at a rate proportional to the actual heat transfer load 12.

It will be apparent that other methods of setting temperature $T_H$ may be used that produce a ratio of proportionality between the use of available energy and the actual heat transfer load. One such method will be described below, but briefly, this involves periodically resetting temperature $T_H$ throughout the predetermined interval, so that changes in the temperature differential $T_H - T_O$ correspond to changes in the actual current heat transfer load 12 during the periodic interval.

Having described various steps in the operation of system 10, it is necessary to consider briefly the start-up or initial settings at the beginning of the operation of the system. Firstly, at start-up there will be no historical data from which a load profile and a prediction of the required heat transfer load 12 can be made. However, as will be apparent to those skilled in the art, estimates can and will be made of the building load at the time the building temperature control equipment is designed. These estimates may be used in the operation of system 10 until enough actual data is obtained to produce the desired load profiles.

Secondly, the amount of available energy present or required in reservoir 20 for the initial operation of system 10 will, of course, depend upon such things as the temperature of the water used to fill reservoir 20, and the estimated building load (the time of year or the time of day). If there is insufficient available energy, then it may be necessary to operate system 10 in the storage or charge mode to accumulate available energy before starting-up actual operation.

The setting of temperature $T_W$ at start-up so that the required make-up energy is added to or removed from control circuit 14 is fairly straight-forward. Again, an estimate for the predicted building load will have to be used. Temperature $T_O$ can be measured in the usual way. However, a value for temperature $T_H$ will have to be estimated from an estimate of the predicted extreme temperature $T_O$.

Once the initial settings have been made, system 10 can be started-up. Assuming that the system components have been designed properly, any error in the estimated values normally will result in an excess or deficiency of available energy which can be accommodated during the next predetermined interval.

After the start-up of system 10, normal operation of the system commences. As discussed above, at the beginning of a predetermined interval the calculations are made and temperatures $T_W$ and $T_H$ are set. However, there are a few additional details to be considered in connection with these calculations and the frequency at which the settings are made.

Firstly, if the system is to be operated during a weekday, the load profile for the previous weekdays is used to predict the required energy. Similarly, if the system is to be operated on a Saturday, Sunday or holiday, the corresponding load profile is used for this prediction. Further, either the heating load profile or the cooling load profile is used depending on whether system 10 is to be operated in the respective heating or cooling mode. The additional or different load profiles for weekdays and Saturdays, etc. are used to increase the accuracy of the predicted load requirements.

Secondly, the calculations are updated and the temperature settings are reset periodically at 20 minute intervals throughout the predetermined interval. For example, every 20 minutes a prediction is made from the appropriate load profile of the required heat transfer load for the remainder of the predetermined interval (i.e. the predetermined interval is reduced or decreased by the 20 minute periodic interval). A new value for the existing available energy is determined based on current temperatures $T_O$ and $T_R$. Also, a new calculation is made for make-up energy, and temperature $T_W$ is reset from this calculation. However, temperature $T_H$ is not reset unless the prior extreme temperature $T_O$ has changed, or unless this temperature is normally being reset on the basis of current actual heat transfer load, as described below.

Finally, as discussed above, the predetermined interval is broken down into a day portion and a night portion. The calculations and temperatures settings which are made at the 20 minute intervals are done by using predictions of required heat transfer load for the remainder of the day portion or night portion of the predetermined interval, depending on whether the calculations are done during the respective day or night portion. The remainder of the day or night portion then becomes the "predetermined interval" for the 20 minute up-date calculations.

It will be appreciated that the additional calculations and settings done at the 20 minute intervals increase the accuracy and efficiency of temperature control system 10 by frequently correcting any error between the predicted and actual heat transfer rates in the system.

Figure 4:
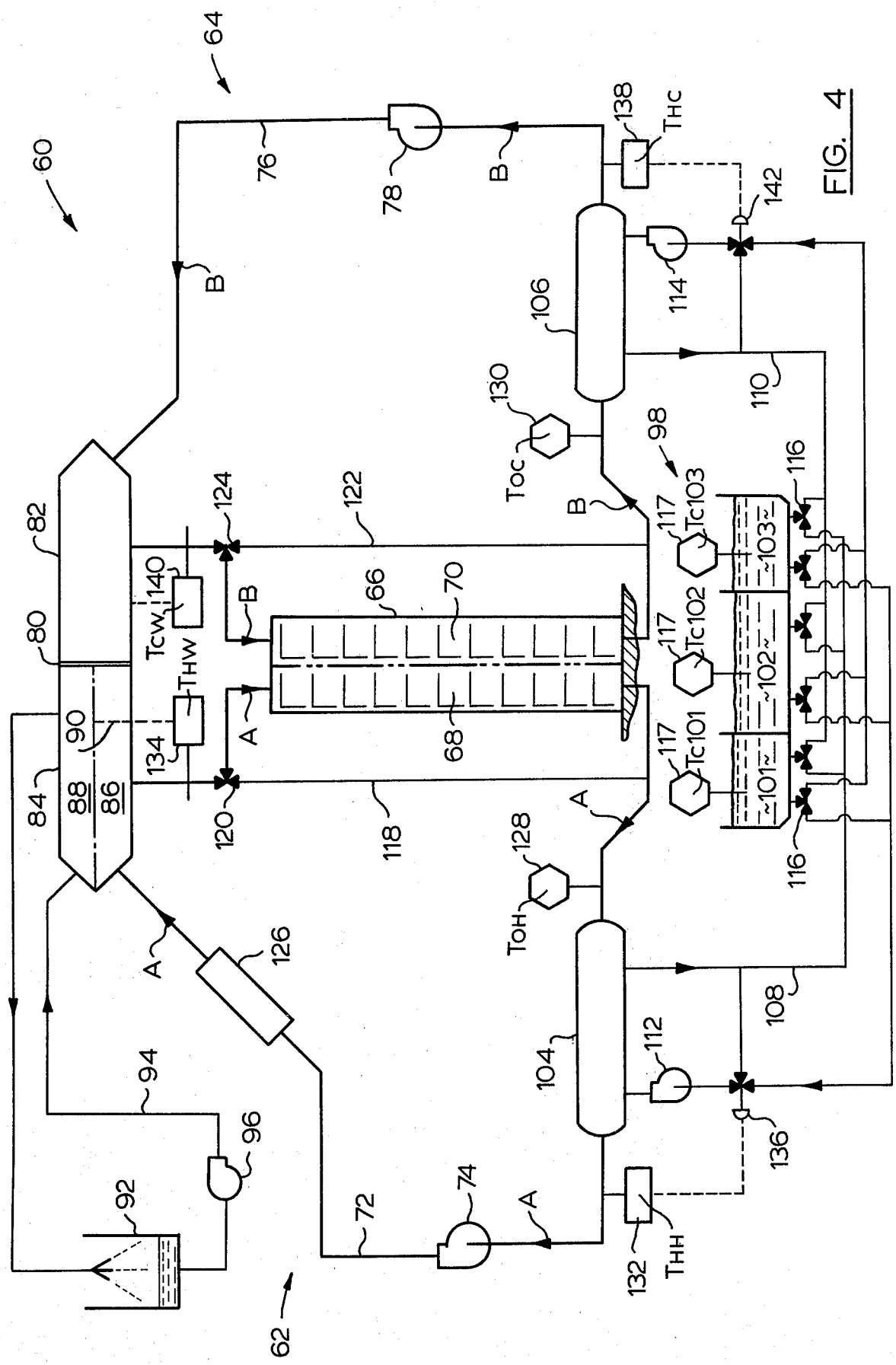
FIG. 4 is a schematic drawing of a preferred embodiment of a temperature control system having separate heating and cooling circuits for heating and cooling a building.

Referring next to FIG. 4, there is shown a schematic drawing of a preferred embodiment of a temperature control system generally indicated by reference numeral 60. System 60 has a heating system or circuit 62 and a separate cooling system or circuit 64 for respectively heating and cooling a building 66 having a heating load 68 and a separate cooling load 70. Heating and cooling loads 68, 70 are similar to building heat transfer load 12 shown in FIG. 1, except that these loads 68, 70 respectively represent all of the sources of heat loss and heat gain when building 66 is respectively being heated or cooled, or both.

System 60 may be used in a typical highrise office building or the like, wherein there is normally at all times both a heating load and a cooling load. For example, in the winter the outer or peripheral regions of the building usually require heating, while the inner core areas of the building require cooling. In the summer, the peripheral regions of the building usually require cooling, while the core regions require heating. However, it is possible at certain times of the day or year that heating only, or cooling only, is required. System 60 is designed to provide for various combinations of building heating or cooling requirements, as will be described below.

Heating circuit 62 and cooling circuit 64 are both similar to the simplified temperature control system 10 shown in FIG. 1. However, heating circuit 62 is intended to operate only in a heating mode, and cooling circuit 64 is intended to operate only in a cooling mode. Heating circuit 62 includes a temperature control circuit 72, through which temperature control fluid (e.g. water) is circulated in the direction of arrows A by a pump 74. Similarly, cooling circuit 64 includes a temperature control circuit 76, through which temperature control fluid is circulated in the direction of arrows B by a pump 78. System 60 also has a heat transfer unit 80 coupled to control circuits 72, 76 and which includes a chiller 82 and a condenser 84. Transfer unit 80 is similar to a conventional air conditioning unit, in that during operation, heat energy is pumped or transferred from chiller 82 to condenser 84. Chiller 82 is a source of cooling, and when transfer unit 80 is operating, chiller 82 removes heat energy from heating control circuit 76. Condenser 84 is a source of heating, and when transfer unit 80 is operating, condenser 84 may add heat energy to control circuit 72.

It is to be noted, that condenser 84 does not necessarily add heat energy to control circuit 72 at all times that transfer unit 80 is operating. Condenser 84 is divided into two portions; namely a heat reclaim or clean condenser 86 and a cooling tower or dirty condenser 88. Combined condenser 84 is provided with a set of temperature controls 90 which can be set to direct the heat energy produced by transfer unit 80 to the clean condenser 86 alone, or both the clean condenser 86 and the dirty condenser 88. A cooling tower 92 is provided in or on building 66, and a tower circuit 94 is provided through which temperature control fluid is pumped by another pump 96. This control fluid passes through dirty condenser 88, and heat energy directed to dirty condenser 88 by temperature controls 90 is transferred to the control fluid and is then transferred to the atmosphere in cooling tower 92. Thus, if transfer unit 80 is producing more heat energy than can be used in heating circuit 62, this excess heat energy is directed to the control fluid in tower circuit 94 to be dumped to the atmosphere by cooling tower 92.

System 60 also has an energy storage reservoir 98 which includes three separate compartments 101, 102 and 103. In the preferred embodiment, compartments 101 and 103 typically hold approximately 350 thousand gallons, and compartment 102 holds 800 thousand gallons of temperature control fluid. Heating circuit 62 includes a heat exchanger 104, and cooling circuit 64 also includes a heat exchanger 106. Temperature control fluid in reservoir 98 is circulated through heat exchangers 104, 106 by respective control circuits 108, 110 having respective pumps 112, 114.

A plurality of two-way valves 116 and associated piping is provided so that either control circuit 108 or control circuit 110 can be connected to any one or more of the three reservoir compartments 101, 102 and 103. In the preferred embodiment, only compartments 101 and 102 are used with heating circuit 62, whereas all 3 compartments may be used with cooling circuit 64. The sequence and conditions under which each of these compartments is used with either heating or cooling circuits 62, 64 will be discussed further below.

As in system 10 shown in FIG. 1, reservoir 98 is provided with a plurality of temperature sensors 117 in each of the compartments 101, 102 and 103 for sensing the temperature of equal volume fluid segments in these compartments. The individual temperatures are averaged for each compartment to give the average fluid temperature in these compartments (denoted $T_{C101}$, $T_{C102}$ and $T_{C103}$ for temperature - compartment 101, etc.) for the calculation of instantaneous available energy as described above for system 10. However, in addition to the existing available energy calculation relative to each compartment, four other available energy calculations may be made for the various possible combinations of compartments, as will be described further below.

Heating circuit 62 also has a by-pass conduit or line 118, and a two-way valve 120 for diverting the flow of temperature control fluid from building heating load 68 through by-pass line 118. Similarly, cooling circuit 64 has a by-pass line 122, and a two-way valve 124 for diverting the flow of temperature control fluid from cooling load 70 through by-pass line 122. As in system 10 shown in FIG. 1, by-pass lines 118, 122 are used when it is desired to transfer heat energy or cooling capacity directly from transfer unit 80, through respective heat exchangers 104, 106, to reservoir 98. This direct transfer may be used when it is desired to store heat energy in any of compartments 101, 102, or 103, or when it is desired to charge any of these compartments with cooling. Further, if only part of the energy (i.e. heating or cooling) produced by transfer unit 80 is required for building loads 68, 70, the excess produced energy could be diverted through by-pass lines 118, 122. This could happen, for example, when clean condenser 86 is producing more heat energy than is required by building heating load 68. However, in the preferred embodiment, this excess produced energy would normally be directed to cooling tower 92, rather than be diverted through by-pass line 118.

Heating circuit 62 also has an auxiliary heater 126 for transferring heat energy to control circuit 72. However, auxiliary heater 126 would not normally be used in temperature control system 60, unless insufficient heat energy was being produced by condenser 84. This would only happen if cooling circuit 64 required no more cooling, either for building cooling load 70 or for charging reservoir 98, in which case chiller 82 would not be operated and condenser 84 would not be producing any heat energy.

Heating circuit 62 includes a temperature sensor 128 for measuring the temperature of the control fluid coming out of heating load 68 and entering heat exchanger 104 (hereinafter denoted $T_{OH}$ for temperature - out, heating). Similarly, cooling circuit 64 has a temperature sensor 130 for measuring the temperature of the control fluid entering heat exchanger 106 (hereinafter denoted $T_{OC}$ for temperature - out, cooling). Heating circuit 62 also has a temperature controller 132 for monitoring and controlling temperature $T_{HH}$ (for temperature - heat exchanger, heating), and a temperature controller 134 for monitoring and controlling temperature $T_{HW}$ (for temperature - heating water). Controller 132 operates a control valve 136 for controlling fluid flow in circuit 108, and controller 134 operates temperature controller 90 for directing heat energy between clean and dirty condensers 86, 88.

Cooling circuit 64 also has a temperature controller 138 for monitoring and controlling temperature $T_{HC}$ (for temperature - heat exchanger, cooling), and a temperature controller 140 for monitoring and controlling temperature $T_{CW}$ (for temperature-cooling water). Controller 138 operates a control valve 142 for controlling fluid flow in circuit 110, and controller 140 operates chiller 82 to regulate or control the external or make-up cooling energy contribution or output of the chiller.

It will be appreciated that the amount of heat energy produced by condenser 84 is proportional to the amount of cooling produced by chiller 82. Further, if the temperature of the control fluid entering the chiller ($T_{HC}$) is near or equal to temperature $T_{CW}$, then chiller 82 respectively will produce little or no cooling, and therefore condenser 84 will provide little or no heat energy. In this case, it may be necessary to operate auxiliary heater 126 to provide the necessary heat energy for building heating load 68.

Having described the apparatus for operating temperature control system 60, the method of operating this system will now be described briefly. Generally, the operation of system 60 is very similar to the operation of system 10 shown in FIG. 1. Weighted average load profiles are produced for both heating circuit 62 and cooling circuit 64, based on the respective temperature differentials $T_{HW} - T_{OH}$ and $T_{CW} - T_{OC}$, and control circuit flow constants calculated for each control circuit. These load profiles are used to predict the required amount of heat energy to be transferred between building loads 68, 70 and the control fluid in respective control circuits 72, 76 for the remainder of the day or night portion of the upcoming predetermined interval. The instantaneous or existing available energy is calculated for each circuit based on the temperature differentials between respective temperatures $T_{OH}$ and $T_{OC}$ and the reservoir average temperature. However, it will be appreciated that for both $T_{OH}$ and $T_{OC}$, seven different calculations of available energy can be made for the different reservoir compartments either alone or in combination. Initially, one of these combinations of reservoir compartments is selected, as discussed below, and the calculation is continued with this mode of operation.

Having calculated the required energy and available energy for both the heating and cooling circuits, the calculation of the make-up energy required is then made to determine the settings for temperatures $T_{HW}$ and $T_{CW}$. Controllers 134, 140 are then set at these temperatures and system 60 is put into operation. If desired, temperatures $T_{HH}$ and $T_{OC}$ can be reset (i.e. instead of 8° above or below the previous extreme $T_{OH}$ or $T_{OC}$), as described below.

It will be apparent that the above calculations could result in incompatible modes of operation for the heating and cooling circuits. For example, to obtain the required available energy for each circuit, the calculations may indicate that one or more of the reservoir compartments must be assigned simultaneously to both of the circuits. If this happens, then the calculations must be repeated using a different combination of reservoir compartments to provide the required available energy, or new values for temperatures $T_{CW}$ or $T_{HW}$ must be chosen so that compatible reservoir compartment assignment provides sufficient available energy and a valid mode of operation is selected.

Further description of the method of operating system 60 will be presented below, but first reference is made to FIG. 5, which shows a portion of system 60 modified to provide more flexibility in the operation of this system.

Figure 5:
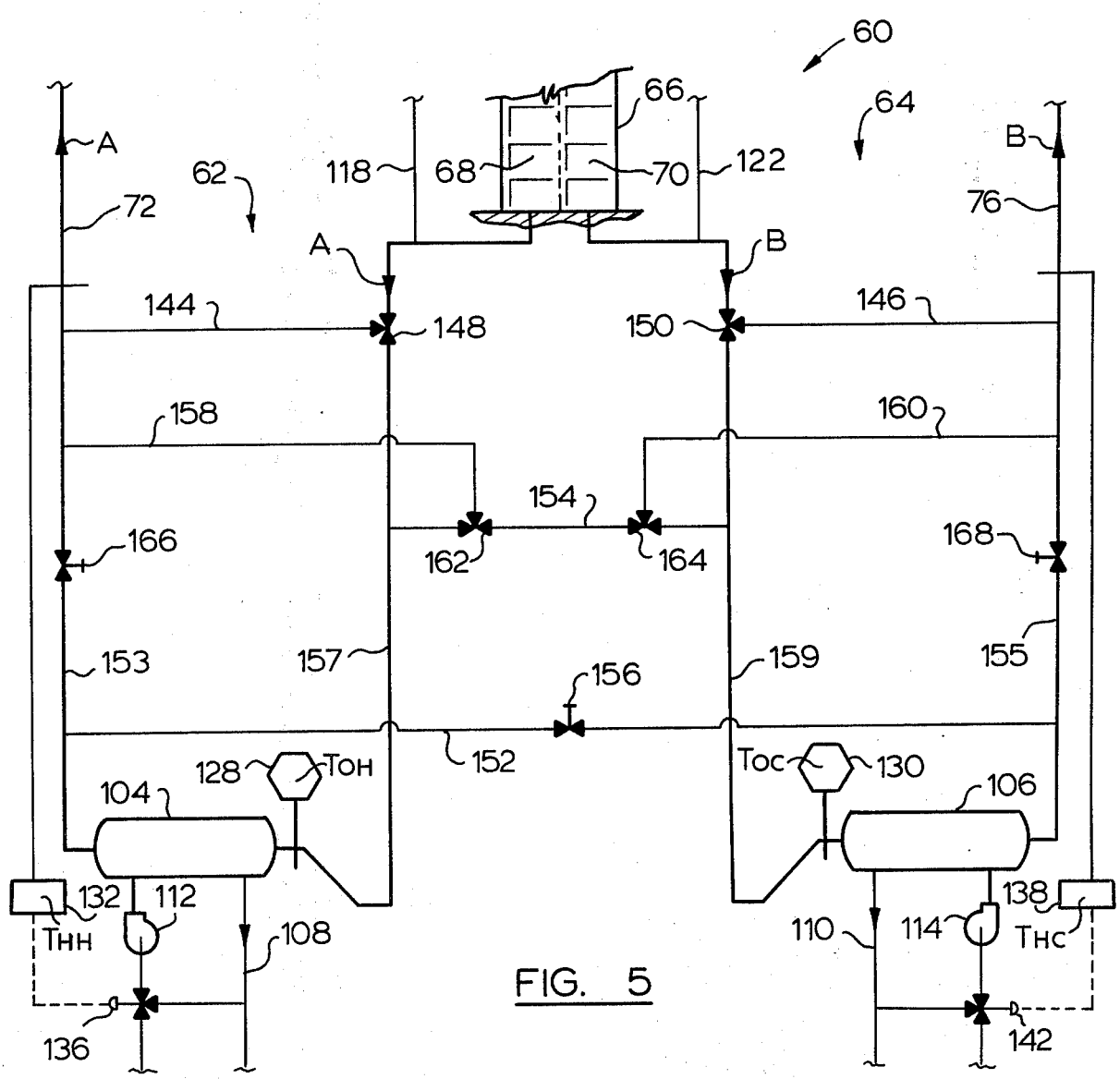
FIG. 5 is a schematic view of part of the system shown in FIG. 4, showing some alternate or modified piping connections.

The modifications made to system 60 as shown in FIG. 5 relate to additional piping and valving, so that both heat exchangers 104, 106 can be connected into, or operate in either the heating circuit 62 or the cooling circuit 64. In addition, heat exchangers 104, 106 can be connected for either series or parallel operation in either of the circuits 62, 64. Heating and cooling circuits 62, 64 have respective by-pass lines 144, 146 through which fluid flow may be diverted by respective two-way valves 148, 150. When both heat exchangers 104, 106 are being used (either in series or parallel) for one of the circuits 62, 64, fluid is diverted through the respective by-pass line 144, 146 in the other of the circuits.

A cross-over line 152 between circuits 62, 64 is used to connect respective heat exchanger output lines or pipes 153, 155, and a second cross-over line 154 is used to connect respective heat exchanger input pipes 157, 159. Cross-over line 152 has a valve 156 which is normally closed, but which is open whenever heat exchangers 104, 106 are operated in either series or parallel.

Secondary by-pass lines 158, 160 in respective circuits 62, 64 communicate with cross-over line 154 and the respective heat exchanger output pipes, 153, 155. By-pass lines 158, 160 are joined to cross-over line 154 by respective two-way valves 162, 164 which divert fluid flow as will be apparent from the description below. Finally, heat exchanger output pipes 153, 155 have respective valves 166, 168 which are normally open, but are closed when the heat exchangers are operated in series.

When both the heat exchangers are to be operated for heating, fluid in cooling circuit 64 is diverted through by-pass line 146. For series connection, fluid flows through the following elements in order: input pipe 157, heat exchanger 104, output pipe 153, cross-over line 152, output pipe 155 (now an input pipe), heat exchanger 106, input pipe 159 (now an output pipe), cross-over line 154, by-pass line 158, and output pipe 153. For parallel connection, fluid flows through the following elements in order: input pipe 157, cross-over line 154 and input pipe 159 as well as input pipe 157, both heat exchangers 104, 106, both output pipes 153, 155, and cross-over line 152 to output pipe 153. It will be apparent that similar flows occur when both heat exchangers are used for series cooling or parallel cooling connections.

When heat exchangers 104, 106 are connected in series, or parallel, each heat exchanger can be connected to a different reservoir compartment, and therefore each heat exchanger can produce a temperature differential in the temperature control fluid passing therethrough. In series connection, these temperature differentials are cumulative or additive, so that a total temperature differential of 13° to 15° can be produced (as compared to 8° for a single heat exchanger). In parallel connection, the mass flow rates are cumulative, the total temperature differential being the same as for single heat exchanger operation. However, if either series of parallel connections are used, a faster depletion of a higher contribution rate of available energy in system 60 is produced.

From the above description, it will be appreciated that many variations or combinations of operating modes are possible for heating system 62 and cooling system 64. In fact, in the preferred embodiment there are 28 cooling modes and 12 heating modes that may be selected for the respective cooling and heating circuits providing approximately 92 valid modes of operation for the combined circuits. Some representative examples of combinations of these modes are set out in the following chart, wherein the seasons in which these modes are likely to be used are indicated by an X (W = winter, F/S = fall or spring, and S = summer). The number of the mode increases as the season of the year becomes hotter (i.e. winter to summer). The symbol Hx in the chart represents "heat exchanger", and reservoir compartments 101, 102, and 103 are respectively referred to as No. 1, No. 2, and No. 3.

| MODE | SEASON W | SEASON F/S | SEASON S | CHILLER/ CONDENSER | HEAT EXCHANGERS | COOLING/ HEATING OPERATION | RESERVOIR COMPARTMENTS |
|---|---|---|---|---|---|---|---|
| 1 | X | | | On | Single-Cooling | Cooling-charge | No. 3 on Hx106 |
| | | | | | Single-Heating | Heating-Use | No. 1 then No. 2 on Hx104 |
| 2 | X | | | On | Dual Heating (Parallel) | Cooling-by-pass | No. 1 on Hx104 & No. 2 on Hx106 |
| | | | | | | Heating-use | No. 3 charged cooling |
| 3 | X | X | | On | Single-Cooling | Cooling-use | No. 3 on Hx106 |
| | | | | | | | No. 1 on Hx104 |
| | | | | | Single-Heating | Heating-Store | No. 2 not used |
| 4 | X | X | | Off | Single-Cooling | Cooling-use | No. 3 on Hx106 |
| | | | | | | | No. 1 on Hx104 |
| | | | | | Single-Heating | Heating-use | No. 2 not used |
| 5 | X | X | | On | Single-Cooling | Cooling-use | No. 3 on Hx106 |
| | | | | | | | No. 1 on Hx104 |
| | | | | | Single-heating | Heating-Store | No. 2 not used |
| 6 | | X | | Off | Single-Cooling | Cooling-use | No. 2 then No. 3 On Hx106 |
| | | | | | Single-Heating | Heating-use | No. 1 on Hx104 |
| 7 | | | X | On | Single-Cooling | Cooling-charge | No. 1 then No. 2 then No. 3 on Hx106 |
| | | | | | | Heating-by-pass | |
| 8 | | X | X | Off | Single-Cooling | Cooling-use | No. 2 on Hx106 |
| | | | | | | Heating-by-pass | No. 1 and No. 3 charged cooling |
| 9 | | | X | On | Dual-Cooling (series) | Cooling-use | No. 1 then No. 3 on Hx104 and No. 2 on Hx106 |
| | | | | | | Heating-by-pass | |

It will be apparent from the above chart that similar charts can be produced for the various operating modes that will be used in the winter, summer, and fall or spring. When it is desired to operate system 60, the chart for the appropriate season is used, and depending upon the outside temperature, a likely operating mode is selected from the chart. Once this possible operating mode is selected, the calculations as described aobve are carried out to determine and set temperatures $T_{CW}$ and $T_{HW}$. If there is insufficient storage capacity in the reservoir compartments to operate in the selected mode, then another mode must be selected and the calculations repeated until an operable mode is obtained.

The order of performing the calculations is to consider the cooling circuit 64 and then the heating circuit 62. The reason for this is that system 60 is basically a heat reclaim system, i.e. the cooling necessary for building 66 is provided, and whatever heat energy is produced from this cooling is used either to heat the building or is stored for future use. If system 60 is not already in operation, estimated values are used in the calculations for temperatures $T_{HC}$ and $T_{CW}$ and the predicted or projected cooling load 70, otherwise factual values and predictions are made based on actual or historical data as discussed above. Briefly, cooling load 70 is predicted from the cooling load profile, the existing available cooling energy to be transferred is measured or calculated for the cooling reservoir compartments to be used according to the operating mode selected, and temperature setting $T_{CW}$ is determined to give a 10 to 15 per cent excess storage capcity. If the mode selected is operative (i.e. there is sufficient storage capacity), similar calculations are carried out for heating circuit 62. If the mode selected is still operative after the heating circuit temperature settings have been determined, system 60 is put into operation. If during the calculations, it is determined that the mode selected is not operative, another mode is selected and the calculation procedure is repeated. If it is not possible to find an operative mode, then building 66 can be cooled and heated if necessary by chiller/condenser 82, 84 while reservoir 98 is charged with sufficient cooling capacity or sufficient heat energy is stored in reservoir 98 to support an operative mode.

As discussed above, after the settings for $T_{CW}$ and $T_{HW}$ have been determined, it is also possible to reset temperature $T_{HC}$ and $T_{HH}$ (rather than using the 8 degree temperature differential with respect to $T_{OH}$ and $T_{OC}$) so that an alternate method is provided for dissipating the available energy in proportion to the transfer of energy between the control fluid and the building load. This can be done by performing a type of anticipation control calculation using some of the historical data from the load profiles. This calculation will be described by way of example with reference to cooling circuit 64, but similar calculations may be made for heating circuit 62.

The actual current heat transfer rate in building load 70 is measured using the temperature differential $T_{OC} - T_{CW}$ in a manner as described above. This rate is compared with a similar value for this rate at the beginning of the last 20 minute interval, and a straight line projection or extrapolation is made to obtain a projected heat transfer rate at the end of the upcoming 20 minute interval. At the end of this upcoming interval, if the actual rate for this point in time is higher than the projected rate for this point in time (i.e. temperature $T_{OC}$ is higher than expected), temperature $T_{HC}$ is in effect "reset" higher by direct control of valve 142 to decrease the flow in control circuit 110 to maintain the temperature differential across heat exchanger 106. Similarly, if the actual rate is less than the projected rate (temperature $T_{OC}$ lower than expected), temperature $T_{HC}$ is in effect adjusted downwardly by increasing the flow in control circuit 110 to maintain the heat exchanger temperature differential.

In actual fact, in the anticipation control of temperatures $T_{HC}$ and $T_{HH}$ temperature controllers are not used, and temperatures $T_{HC}$ and $T_{HH}$ are not "set" or "reset". Control valves 136, 142 are directly positioned in proportion to the projected building heat transfer rate, and if the measured transfer rate is different than the projected rate, the control valves are adjusted to vary the flow in control circuits 108, 110 to increase or decrease temperatures $T_{HC}$ and $T_{HH}$ as described above. These temperatures are only measured or sensed to see if the required adjustment of $T_{HC}$ and $T_{HH}$ has been achieved.

It will be appreciated therefore, that the output contribution of heat exchanger 106 is varied (i.e. temperature $T_{HC}$), so that the heat exchanger (available cooling energy) contribution continues to be proportional to the actual heat transfer load 70, whether load 70 increases or decreases with respect to the value projected from the load profile. If the actual cooling load is greater than the predicted cooling load, the excess cooling required is provided by chiller 82 because input temperature $T_{HC}$ is increased while temperature $T_{CW}$ remains constant. If temperature $T_{HC}$ were to remain at 8° below the previous day maximum for temperature $T_{OC}$, then if the the actual heat transfer rate in building load 70 continues to be higher than the predicted maximum, temperature $T_{OC}$ could rise above the 8° differential. Heat exchanger 106 would then be producing a constant maximum cooling contribution to cooling circuit 64. By adjusting temperature $T_{HC}$ upwardly using anticipation control, heat exchanger 106 continues to contribute cooling or dissipate available energy in proportion to the building heat transfer load, even if the actual building load continues to be significantly different than projected or predicted.

As mentioned above, any major differences in the actual load 70 compared to the predicted load 70 will be absorbed by chiller 82. Therefore, if the actual load is significantly less than predicted, less external enery will have to be provided by chiller 82, because the total available energy in the reservoir will be used.

The anticipation control of temperature $T_{HC}$ and $T_{HH}$ is particularly useful where temperature control circuits 76, 110 and 72, 108 are in direct communication (no heat exchangers 104, 106) or where temperature control system 60 is computer controlled.

It will be appreciated that because the calculations and settings for system 60 are updated every 20 minutes any discrepancy between the predictions and actual performance of the system will be quickly apparent and appropriate corrections in the settings will be made.

Having described a preferred embodiment of the invention, it will be apparent that various modifications can be made in the apparatus and method described. For example, heat exchangers 104, 106 could be eliminated so that respective control circuits 72, 76 would be coupled in direct communication with respective control circuits 108, 110. The fluid flow rate in the combined circuits could then be regulated to provide the desired control of the dissipation of available energy. This flow rate could be regulated by varying the pump output or the total flow rate in each of the combined circuits, or by-pass conduits could be used to control the amount of fluid removed from the reservoir compartments to the control circuits. In the direct coupling configuration, it would be preferable to consider the temperatures of the fluids in the control circuits as well as in the reservoir in determining the existing available energy.

In addition to or in lieu of controlling the various temperature settings in system 60, the flow rates in temperature control circuits 72, 76 could be regulated to control the heat transfer rates in the system, since the heat transfer rates are proportional to both temperature differential and mass flow rate. Also, the temperature settings in system 60 could be made taking into account any variations in flow rates in the system caused by changes in the various temperature control circuits or building loads.

It will be apparent that the predictions from the load profiles of building heat transfer loads could be done in several different ways. For example, a simple average of historic date could be used, or various other weighted average formulae could be used. Also, data could be collected on a different interval than 20 minutes to obtain more accurate or less accurate calculations, as desired. Also, flow sensors could be used in control circuits 72, 76 to verify the date used in the predicted load calculations.

For the calculation of available energy, the mass and temperatures of the fluids in the various control circuits could be included with the reservoir data, if more accuracy is desired.

It will be appreciated that the calculations and control of system 60 could easily be accomplished using a digital computer, or the like. If a computer is used to control system 60, then temperature controllers 132, 138 and 134, 140 could be included as part of the computer control system (as in the anticipation control method discussed above), rather than using separate controllers. However, separate controllers have the advantage that they may be manually operated if the computer malfunctions.

If a computer is used to control system 60, then the whole system could be operated automatically. For example, calculations could be made for every one of the possible modes of operation of system 60, and the computer could select and set the system parameters for operation in the best of the operative or valid modes available for the particular time of day or time of year.

The direction of flow of temperature control fluid in control circuits 72, 76 could be reversed if desired. However, the heat exchangers would then immediately precede the building loads, and in order to provide adequate temperature differentials across the heat exchangers, the reservoir compartments would have to be kept at higher (heating circuit) and lower (cooling circuit) temperatures than would be the case with flow directions as shown in FIG. 4.

As described above, the energy contribution of the transfer unit is such that the sum of the available energy and the transfer unit energy contribution is preferrably from 110 to 115 percent of the predicted required energy for the predetermined interval. This percentage range could be varied as desired, as long as the sum of the transfer unit contribution and the available energy contribution is at least equal to the predicted required energy.

The chiller and condenser could be separate units, so that heating circuit 62 and cooling circuit 64 could be operated completely independently. However, this would not be as efficient because heat energy produced by the chiller and cooling produced by the condenser (or other heater) would be wasted.

It will be apparent that the temperature control fluid could be other liquids or gases than water. Further, if water is used as the control fluid, suitable aditives could be mixed with the water to prevent corrosion or mildew, improve heat transferability, etc., as will be apparent to those skilled in the art.

It will also be appreciated that in the temperature control system of the present invention, it is desirable to keep temperature $T_{CW}$ as high as possible and temperature $T_{HW}$ as low as possible, and still provide adequate energy transfer in the building load to cool and heat the building. In this way, the amount of external energy used is minimized and the amount of stored energy used is maximized. System 60 therefore reduces the total building energy requirements to the extent that stored energy is used that would otherwise be wasted.

Finally, the temperature control systems of the present invention have been described as being used to heat or cool a building having a plurality of individual fan coil units making up the heating and cooling loads. However, the present invention could be used to heat or cool other structures than buildings. Alternatively, the present invention could be used to control the temperature of several buildings, or even whole blocks of buildings, with each structure having its own heat storage reservoir or by using one large common reservoir with all of the buildings collectively forming the heating or cooling loads.

What I claim is:

1. A method of controlling the temperature in a building having a building heat transfer load, the method comprising the steps of:
   a. passing a temperature control fluid through the building to transfer heat energy between the fluid and said building load;
   b. predicting the amount of heat energy required to be transferred between the fluid and the building load over a predetermined interval;
   c. measuring the amount of heat energy in the fluid and determining the existing available energy to be transferred between the fluid and the building load;
   d. varying the heat energy in the fluid during said predetermined interval at a point remote from the building load if said existing available energy to be transferred is less than said energy required to be transferred, said variation being at a rate such that the total available energy to be transferred, as varied over the predetermined interval, is at least equal to said energy required to be transferred; and,
   e. controlling the flow of the fluid so that said existing available energy to be transferred is dissipated at a rate proportional to the difference between the rate of transfer of energy between the fluid and the building load, and said rate of variation.

2. A method as claimed in claim 1 wherein the heat energy required to be transferred over said predetermined interval is predicted by measuring the amount of energy transferred between the fluid and the building load during a plurality of previous similar predetermined intervals, and projecting on a weighted average basis the amount of heat energy required to be transferred.

3. A method as claimed in claim 1 wherein the amount of existing available energy to be transferred is determined by measuring the temperature differential between the fluid output from the building load and the average temperature of the temperature control fluid.

4. A method as claimed in claim 1 wherein said rate of variation of energy in the fluid is generally constant, the constant rate of variation being provided by adding heat energy to the fluid and removing heat energy from the fluid to maintain a generally constant temperature differential in the temperature control fluid remote from the building load.

5. A method as claimed in claim 4 wherein the flow of fluid is controlled to dissipate said existing available energy by increasing and decreasing the rate of flow in direct proportion to a respective increase and decrease in the fluid temperature differential across the building load.

6. A method as claimed in claim 1 wherein the flow of fluid is controlled to dissipate said existing available energy by separating a major portion of the fluid from the fluid passing through the building, and regulating the rate of heat transfer between said major fluid portion and the fluid passing through the building.

7. A method as claimed in claim 1 and further comprising the step of varying the amount of heat energy in the fluid before said predetermined interval commences, to provide said existing available energy to be transferred when said predetermined interval commences.

8. A method as claimed in claim 1 wherein steps (b) and (c) are performed at a plurality of periodic intervals of shorter duration than said predetermined interval, and wherein said predetermined interval decreases by an amount equal to one of said periodic intervals each time said steps (b) and (c) are performed.

9. A method of controlling the temperature of a building having a building heat transfer load, a temperature control circuit containing a temperature control fluid, and heat energy storage means coupled to the control circuit, the method comprising the steps of:
   a. passing the temperature control fluid through the temperature control circuit to transfer heat energy between the fluid and said building load;
   b. predicting the amount of heat energy required to be transferred between the fluid and the building load over a predetermined interval;
   c. measuring the amount of heat energy in the storage means and determining the existing available energy to be transferred between the storage means and the fluid in the control circuit;
   d. varying the heat energy in the fluid during said predetermined interval at a point between the storage means and the building load if said existing available energy to be transferred is less than said energy required to be transferred, said variation being at a rate such that the total heat energy available to be transferred between the building load and the fluid over the predetermined interval is at least equal to said energy required to be transferred during said predetermined interval; and
   e. controlling the flow of fluid in the storage means so that existing available energy to be transferred is dissipated at a rate proportional to the difference between the rate of transfer of energy between the fluid and the building load, and said rate of variation.

10. A method as claimed in claim 9 wherein the heat energy in the fluid is varied so that the total available energy to be transferred, as varied, is between 110 and 115 percent of said energy required to be transferred during said predetermined interval.

11. A method as claimed in claim 10 wherein steps (b) and (c) are performed at a plurality of periodic intervals of shorter duration than said predetermined interval, and wherein said predetermined interval decreases by an amount equal to one of said periodic intervals each time said steps (b) and (c) are performed.

12. A method as claimed in claim 10 wherein the amount of existing available energy in the fluid is determined by measuring the temperature differential between the fluid output from the building load and the average fluid temperature in the storage means.

13. A method as claimed in claim 10 wherein the flow of fluid in the storage means is controlled by increasing and decreasing the rate of said flow in direct proportion to respective increases and decreases in the fluid temperature differential across the storage means.

14. A method as claimed in claim 9 wherein said rate of variation of heat energy in the fluid is generally constant, the constant rate of variation being provided by adding heat energy to the fluid and removing heat energy from the fluid to maintain a generally constant temperature differential in the temperature control fluid.

15. A method as claimed in claim 14 wherein the flow of fluid in the storage means is controlled be increasing and decreasing the rate of said flow in direct proportion to respective increases and decreases in the fluid temperature differential across the building load.

16. A method as claimed in claim 9, wherein said storage means contains temperature control fluid which is separate from the temperature control fluid in said control circuit, and wherein said storage means fluid is brought into juxtaposition with said control circuit fluid to transfer heat energy therebetween, and wherein said storage means fluid flow is controlled by regulating said flow to maintain the temperature of said control circuit fluid at a preselected value downstream of said point of juxtaposition.

17. A method as claimed in claim 10 wherein said building heat transfer load is a heating load, and wherein said fluid is passed through the control circuit at a generally constant rate, and wherein the heat energy in the fluid is varied by adding heat energy to the fluid at a generally constant rate.

18. A method as claimed in claim 10 wherein said building heat transfer load is a cooling load, and wherein said fluid is passed through the control circuit at a generally constant rate, and wherein the heat energy in the fluid is varied by removing heat energy from the fluid at a generally constant rate.

19. A method as claimed in claim 9 and further comprising the step of varying the amount of heat energy in said storage means before said predetermined interval commences to provide said existing available energy to be transferred when said predetermined interval commences.

20. A method of controlling the temperature of a building having a building heating load and a building cooling load, respective heating and cooling temperature control circuits containing temperature control fluids for each load, and respective heating and cooling heat energy storage means coupled to the control circuits, the method comprising the steps of:

a. passing the temperature control fluids through the respective temperature control circuits to transfer heat energy to said building heating load and transfer heat energy from said building cooling load;

b. predicting the amount of heat energy required to be transferred from said cooling load and required to be transferrd to said heating load over a predetermined interval;

c. measuring the amount of heat energy in said storage means and determining the existing heating available energy to be transferred from said heating storage means to said heating load and the existing cooling available energy to be transferred from said cooling load to said cooling storage means;

d. adding heat energy to the fluid in said heating circuit if said existing heating available energy is less than said predicted energy required to be transferred to the heating load, and removing heat energy from the fluid in said cooling circuit if said existing cooling available energy is less then said predicted energy required to be transferred from the cooling load, said energy addition and removal being at rates such that the total heating and cooling available energy to be transferred over the predetermined interval is at least equal respectively to said predicted heating and cooling energy required;

e. controlling the flow of fluid in said heating storage means so that said existing heating available energy is dissipated at a rate proportional to the difference between the rate of transfer of energy to the heating load and said rate of addition; and f. controlling the flow of fluid in said cooling storage means so that said existing cooling available energy is dissipated at a rate proportional to the difference between the rate of transfer of energy from the cooling load and said rate of removal.

21. A method as claimed in claim 20 wherein said heat energy removed from the cooling circuit is transferred for addition to the heating circuit, and wherein the fluid flow rate in said heating and cooling circuits are generally constant, and wherein heat energy is added to the heating circuit and removed from the cooling circuit at generally constant rates.

22. A method as claimed in claim 21 wherein heat energy is added to the fluid in the heating circuit and heat energy is removed from the fluid in the cooling circuit so that the total heating and cooling available energy to be transferred over the predetermind interval is between 110 and 115 percent of the respective predicted heating and cooling energy required.

23. A method as claimed in claim 20 wherein steps (b) and (c) are performed at a plurality of periodic intervals of shorter duration than said predetermined interval, and wherein said predetermined interval decreases by an amount equal to one of said periodic intervals each time said steps (b) and (c) are performed.

* * * * *